T. STEBBINS.
FLOAT VALVE.
APPLICATION FILED JULY 29, 1915.
1,226,139.
Patented May 15, 1917.
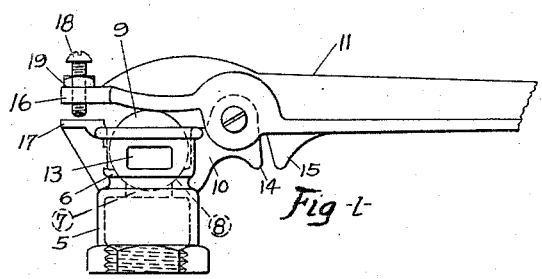
Fig-1-
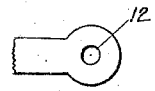
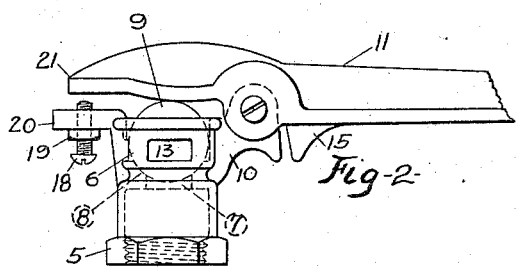
Fig-2-
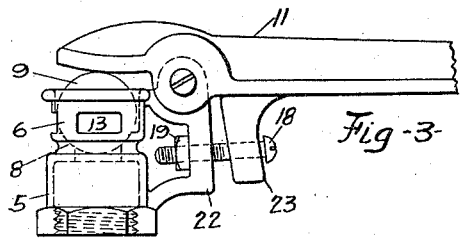
Fig-3-
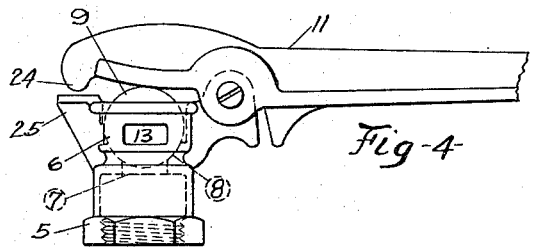
Fig-4-
Witness
Karl M. Hamilton
Inventor
Timothy Stebbins
per A. B. Frenier
Attorney

UNITED STATES PATENT OFFICE.

TIMOTHY STEBBINS, OF DAVENPORT, IOWA, ASSIGNOR TO RED JACKET MFG. CO., OF DAVENPORT, IOWA, A CORPORATION OF IOWA.

FLOAT-VALVE.

1,226,139.      Specification of Letters Patent.      Patented May 15, 1917.

Application filed July 29, 1915. Serial No. 42,559.

*To all whom it may concern:*

Be it known that I, TIMOTHY STEBBINS, a citizen of the United States of America, and resident of Davenport, Scott county, Iowa, have invented a certain new and useful Improvement in Float-Valves, of which the following is a specification.

My invention relates to improvements in float valves, such as are usually submerged in supply tanks, cisterns, watering troughs and the like, to control the flow of water therein, and which are actuated by a float which becomes effective on the inflowing water reaching a predetermined level; and the object of my invention is to provide a construction that is simple, durable, of few parts and inexpensive. A further object is to provide means whereby the pressure on the ball-valve exerted by the float can be regulated, thereby greatly lengthening its life and increasing the efficiency of the entire mechanism.

With these objects in view, my invention consists in certain novel features of construction hereinafter described and shown in the accompanying drawing, in which Figure 1, is a side elevation of my improved device, and Figs. 2, 3, and 4, are similar views of modifications thereof.

In the drawings, in which similar reference numerals refer to similar parts throughout, I have illustrated the preferred form of my invention and show same as comprising the internally threaded body portion 5, by which it is secured to the usual inlet pipe of a tank or trough (not shown) and the valve cage portion 6, immediately above and made integral with the body portion and communicating therewith through the opening 7. A tapering valve seat 8, is provided in the bottom of the cage 6, on which normally rests the hard rubber ball-valve 9. Pivotally secured to the bracket 10, extending from the side of the cage 6, is the lever 11, the forward or shorter end of which passes over the ball 9, and is capable of contacting therewith. The other end extends rearwardly a considerable distance from its point of pivotal connection and may be made several times longer than the forwardly extending portion. The long end of the lever may be provided with the opening 12, through which it may be attached, by a rope or chain to a float resting on the surface of the water above (not shown).

The ball is held in place by the lever, but is preferably free in the cage. It is kept constantly revolving by the water passing through, resulting in even wear on all parts and in the ball always seating perfectly. The large openings 13, in the cage permits free passage of the water. To prevent the short end of the lever 11, from lifting sufficiently to release the ball, as would be the case at a low stage of water, or on starting to fill an empty tank, the bracket 10, is provided with the vertical face 14, which acts as a stop to the downward movement of the long end of the lever by the lug 15, which is made integral with the lever, coming in contact therewith.

The float to be used in connection with the device may consist of any air-tight body, or a piece of wood may be employed for the purpose. When the source of water supply is from an elevated supply tank, such as is usually found on a farm, the water rushes through the float-valve with such force it is common practice to use a large board or even a small fence post as a float, to insure shutting off of the water at the predetermined level. When these needlessly large floats are employed, the rubber ball-valve is soon worn and crushed to a point that the lever finally forces it through the seat. One of the principal features of my invention is the providing of means, which may be adjustable or fixed, whereby the pressure exerted by the lever on the ball by the action of the float, is limited. To this end, the short end of the lever is provided with the extension 16, which is made to register with the bracket 17, formed integral with the cage 6. Screw threaded into the extension 16, is the bolt 18, which may be passed through the bracket the desired distance and fixedly held in such position by the jam nut 19. With the lever normally in contact with the ball 9, the screw is so adjusted as to slightly clear the surface of the bracket 17, so that any upward pressure on the long end of the lever will firmly seat the ball, while any undue pressure will be arrested by the adjusting screw contacting the bracket thereby saving the ball from injury, or being forced through the valve seat.

While I have shown the preferred form of the pressure limiting means in Fig. 1, it may be applied as shown in Fig. 2, wherein the adjusting screw is applied to the fixed member 20, instead of the movable portion 21; or it may be applied to the bracket 22, as shown in Fig. 3, and passed loosely through the lever lug 23, whereby the brackets in association with the screw becomes effective in limiting both the upward and downward movement of the lever; or as shown in Fig. 4, a non-adjustable or fixed stop can be provided as shown at 24. Normally this lug 24, would be held slightly off of the bracket 25, with the lever resting on the ball, while any excessive pressure would be arrested by the lug 24, contacting the bracket 25.

Having thus clearly and fully described my invention, what I claim as new is:

1. In a float valve, the combination of a body portion; a valve cage mounted thereon having an open outer end and communicating at its inner end with the body portion; a valve seat in said cage; a freely movable ball valve normally resting on said seat with a portion of its periphery projecting from the open end of the cage; a lever pivoted intermediate its ends at one side of said cage and having one arm extending across the open end of the cage and adapted to press the ball to its seat; an adjustable stop carried by said ball-engaging arm for limiting the pressure thereof on the ball; and a stop carried by the other arm of said lever for limiting the movement of the ball-engaging arm away from the open end of the cage to confine the ball within the cage.

2. In a float valve, the combination of a body portion; a valve cage communicating therewith at its inner end and having an open outer end; a valve seat in said cage; a ball valve normally resting on said seat with a portion of its periphery projecting from the open end of the cage, said ball being capable of free movement in the cage; a lever pivoted intermediate its ends at one side of said cage and having one arm extending over the open end of the cage and adapted to press the ball to its seat; means for limiting the pressure of said arm on the ball; and means for limiting the movement of said arm away from the open end of the cage to confine the ball within the cage.

Signed by me at Davenport, Iowa, this 27th day of July, 1915.

TIMOTHY STEBBINS.

Witnesses:
S. B. LAFFERTY,
H. R. LAFFERTY.

Copies of this patent may be obtained for five cents each, by addressing the "Commissioner of Patents, Washington, D. C."